Feb. 22, 1938.   P. S. GOULD   2,109,171
DEVICE FOR DEMONSTRATING THE ACTION OF CORDS AND THE LIKE
Filed Aug. 31, 1935
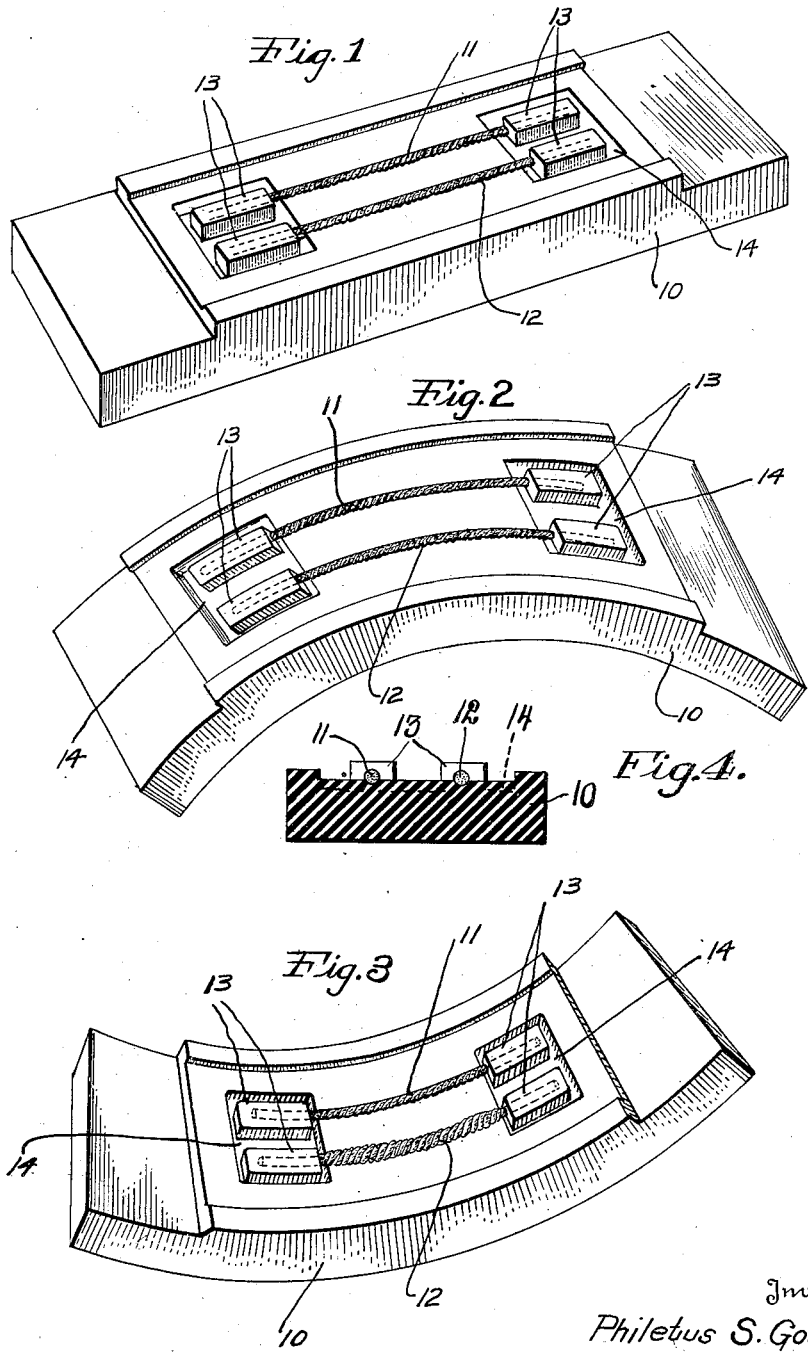
Inventor
Philetus S. Gould
By
Attorney Patented Feb. 22, 1938

2,109,171

UNITED STATES PATENT OFFICE 2,109,171

DEVICE FOR DEMONSTRATING THE ACTION OF CORDS AND THE LIKE

Philetus S. Gould, Akron, Ohio, assignor to Wingfoot Corporation, Wilmington, Del., a corporation of Delaware Application August 31, 1935, Serial No. 38,754

3 Claims. (Cl. 35—50)

This invention relates to a device for comparatively demonstrating the action of cords and it relates more particularly to the action of cords used in pneumatic tires, affording means for observing among other things the flexibility of such cords.

It is well known that the cords used in the carcass of a pneumatic tire must flex innumerable times during the life of the tire. This flexing is usually due to compression or tension or both to which the cords are subjected while the tire is in use. Therefore, the use of cords which will continue to flex without breaking is highly desirable in pneumatic tires, and it becomes important to be able to show prospective purchasers of a tire how and why some cords are better than others for tire use. A number of devices have been designed to comparatively test and demonstrate the action of such cords while under tension or stretch, but no satisfactory device has heretofore been available to comparatively test and demonstrate the action of these cords while under compression and secured to the rubber of the tire. My device is more particularly adapted to demonstrate and compare the action of these cords under compression, but it also may be used to observe the cord action under tension.

Accordingly, it is an object of this invention to provide a device which will permit two or more cords, more particularly those used in pneumatic tires, to be compared under conditions substantially simulating those to which the cords will be subjected while the tires are being used on a vehicle.

Another object is to provide a flexible device to which the cords to be compared may be permanently secured throughout their length whereby the flexing of such cords will be similar to their flexing when embedded in rubber.

A further object is to provide a novel means for comparing two or more cords to permit demonstration and observation of their ability to flex repeatedly.

A further object is to provide a device for demonstrating and permitting observation of the difference between two or more cords that are placed under compression when such cords are formed with a different number of strand twists per inch.

Other objects and advantages will become apparent from the following description taken in conjunction with the accompanying drawing. In the drawing:

Fig. 1 is a perspective view of a device in which the cords are normal,

Fig. 2 is a similar view of the device with the cords under tension,

Fig. 3 is a similar view with the cords under compression, and

Fig. 4 is a vertical transverse sectional view through the device and showing how the cords are partly embedded in rubber.

In making the demonstration I employ a flexible base 10 formed of rubber or other suitable material which will permit flexing of the base 10 when held in the hands of a demonstrator. A pair of cords 11 and 12 are permanently secured to base 10 so as to flex with the latter. As shown, the cords 11 and 12 have a substantial portion of their ends embedded in small rubber blocks 13 which are preferably formed integrally with the base 10. This arrangement prevents the ends of the cords being pulled out of position in the rubber. Cavities 14 are formed around blocks 13 and the portions of cords 11 and 12 extending between these cavities are permanently cemented or otherwise suitably secured to the upper surface of base 10. With this construction it will be apparent that the cords are flexible with the base and if the latter is flexed as indicated in Fig. 2, the cords will be placed under tension, whereas, if the base is flexed as in Fig. 3 the cords will be under compression.

Cord 12 represents a standard cord used in the construction of pneumatic tires while cord 11 is provided with a greater number of strand twists per inch than the standard cord in accordance with the practice of one well known tire manufacturer. When these cords are secured to base 10 and the latter is flexed, the friction of the fibers on each other is readily discernible. Likewise fibers in the cord with the greater number of strand twists hold longer to the rubber than those in the standard cord, the lack of sufficient stretch in the latter to enable it to properly adhere to the rubber, being very apparent when the block is flexed as in Fig. 3.

Of course, the cords 11 and 12 are not completely embedded in rubber in the demonstrating device, because they would not be visible if so embedded. However, since the ends are embedded and the bodies secured to the rubber, the action of the cords is substantially the same as in a tire and my device is therefore admirably suited for demonstrating the cord action that takes place in a tire. The device permits comparison of cords to be made quickly and convincingly and provides an excellent sales instrument for showing prospective customers why certain types of cords are best suited for use in a tire.

Although I have illustrated and described but the preferred embodiment of the device and its mode of operation, it will be apparent to those skilled in the art that the invention is not so limited, but that various modifications may be made without departing from the spirit of the invention or from the scope of the subjoined claims.

I claim:

1. A device for comparatively demonstrating the action of cords and the like comprising a reversely flexible base having a plurality of cords of different characteristics secured throughout their lengths to said base so as to have substantial portions visible for comparison in either tension or compression as the base is flexed.

2. A device for comparatively demonstrating the action of cords and the like comprising a reversely flexible rubber base having a plurality of cords of different characteristics with their ends embedded in the rubber of the base while the bodies of said cords are secured throughout their lengths on the outer surface of said base so as to have substantial portions visible for comparison in either tension or compression as the base is flexed.

3. A device for comparatively demonstrating the action of cords and the like comprising a flexible rubber base, and rubber blocks secured to said base and extending above the outer surface of said base, there being a plurality of cords having their ends embedded in said blocks while their bodies are secured throughout their lengths to the outer surface of said base so as to be visible to an observer.

PHILETUS S. GOULD.